(12) United States Patent
Doherty et al.

(10) Patent No.: US 10,419,744 B2
(45) Date of Patent: Sep. 17, 2019

(54) TECHNIQUES FOR USER PROFILES FOR VIEWING DEVICES

(75) Inventors: Rina Doherty, Forest Grove, OR (US); Audrey Younkin, Hillsboro, OR (US); Philip Corriveau, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 470 days.

(21) Appl. No.: 13/435,116

(22) Filed: Mar. 30, 2012

(65) Prior Publication Data

US 2013/0257849 A1 Oct. 3, 2013

(51) Int. Cl.
*H04N 13/332* (2018.01)

(52) U.S. Cl.
CPC ..... *H04N 13/332* (2018.05); *H04N 2213/008* (2013.01)

(58) Field of Classification Search
CPC ..................... H04N 13/0429; H04N 2213/008
See application file for complete search history.

(56) References Cited

U.S. PATENT DOCUMENTS

| | | | |
|---|---|---|---|
| 5,745,164 A * | 4/1998 | Faris | 348/60 |
| 2008/0232680 A1 * | 9/2008 | Berestov | H04N 13/0059 382/154 |
| 2009/0073558 A1 * | 3/2009 | Jacobs et al. | 359/464 |
| 2009/0322861 A1 * | 12/2009 | Jacobs et al. | 348/53 |
| 2010/0177172 A1 * | 7/2010 | Ko et al. | 348/53 |
| 2011/0001808 A1 * | 1/2011 | Mentz et al. | 348/59 |
| 2011/0126159 A1 * | 5/2011 | Ko et al. | 715/848 |
| 2011/0134229 A1 * | 6/2011 | Matsumoto et al. | 348/56 |
| 2011/0149028 A1 * | 6/2011 | Klebanov et al. | 348/43 |
| 2011/0149054 A1 | 6/2011 | Sang-un et al. | |
| 2011/0164122 A1 * | 7/2011 | Hardacker | 348/53 |
| 2011/0164123 A1 * | 7/2011 | Park et al. | 348/56 |
| 2011/0199467 A1 * | 8/2011 | Haga | 348/56 |
| 2011/0221874 A1 * | 9/2011 | Oh | 348/51 |
| 2011/0228056 A1 * | 9/2011 | Okumoto | H04N 13/0438 348/51 |
| 2011/0248989 A1 | 10/2011 | Park et al. | |
| 2011/0248991 A1 | 10/2011 | Park et al. | |
| 2011/0298803 A1 * | 12/2011 | King et al. | 345/427 |
| 2012/0023518 A1 * | 1/2012 | Meuninck et al. | 725/25 |
| 2012/0050266 A1 | 3/2012 | MacNaughton et al. | |
| 2012/0069160 A1 * | 3/2012 | Ko | 348/54 |
| 2012/0154553 A1 * | 6/2012 | Zustak et al. | 348/51 |
| 2012/0262477 A1 * | 10/2012 | Buchheit | 345/619 |

OTHER PUBLICATIONS

ISO/IEC, ISO base media file format, Oct. 15, 2008, ISO/IEC, Part 12; pp. 1-120.*
International Search Report and Written Opinion received for PCT Patent Application No. PCT/US2013/033903, dated Jun. 26, 2013, 11 pages.

* cited by examiner

*Primary Examiner* — Peter D Le

(57) ABSTRACT

Techniques are directed to user profiles for viewing devices. A user profile storing one or more defined parameters may be received. The one or more defined parameters may represent viewing information. Descriptive information about the media information to be viewed on the viewing device may be received. One or more settings in a viewing device may be adjusted based on the one or more defined parameters in the user profile and the descriptive information. Other embodiments are described and claimed.

22 Claims, 9 Drawing Sheets

TECHNIQUES FOR USER PROFILES FOR VIEWING DEVICES

BACKGROUND

A user often wears three dimensional glasses while viewing a television or movie screen in order to enjoy three dimensional images. To view higher quality three dimensional images, the three dimensional glasses often have technology embedded within the glasses. For example, the three dimensional glasses may have active shutters which communicate with a device displaying a three dimensional image.

Different viewers desire to view three dimensional images differently. Some viewers are particularly prone to feeling nauseated based on the depth of the three dimensional image. Other viewers may desire a higher or lower resolution of the images. However, the settings for currently available three dimensional glasses are the same for all users. Three dimensional glasses are currently not tailored to the individual user. By assuming that the design and technology in the glasses satisfy all viewers, some viewers are very unhappy with their three dimensional experience while others feel sick and/or are unable to enjoy the benefit of three dimensional images. It is with respect to these and other considerations that the present improvements have been needed.

DETAILED DESCRIPTION

Figure 1:
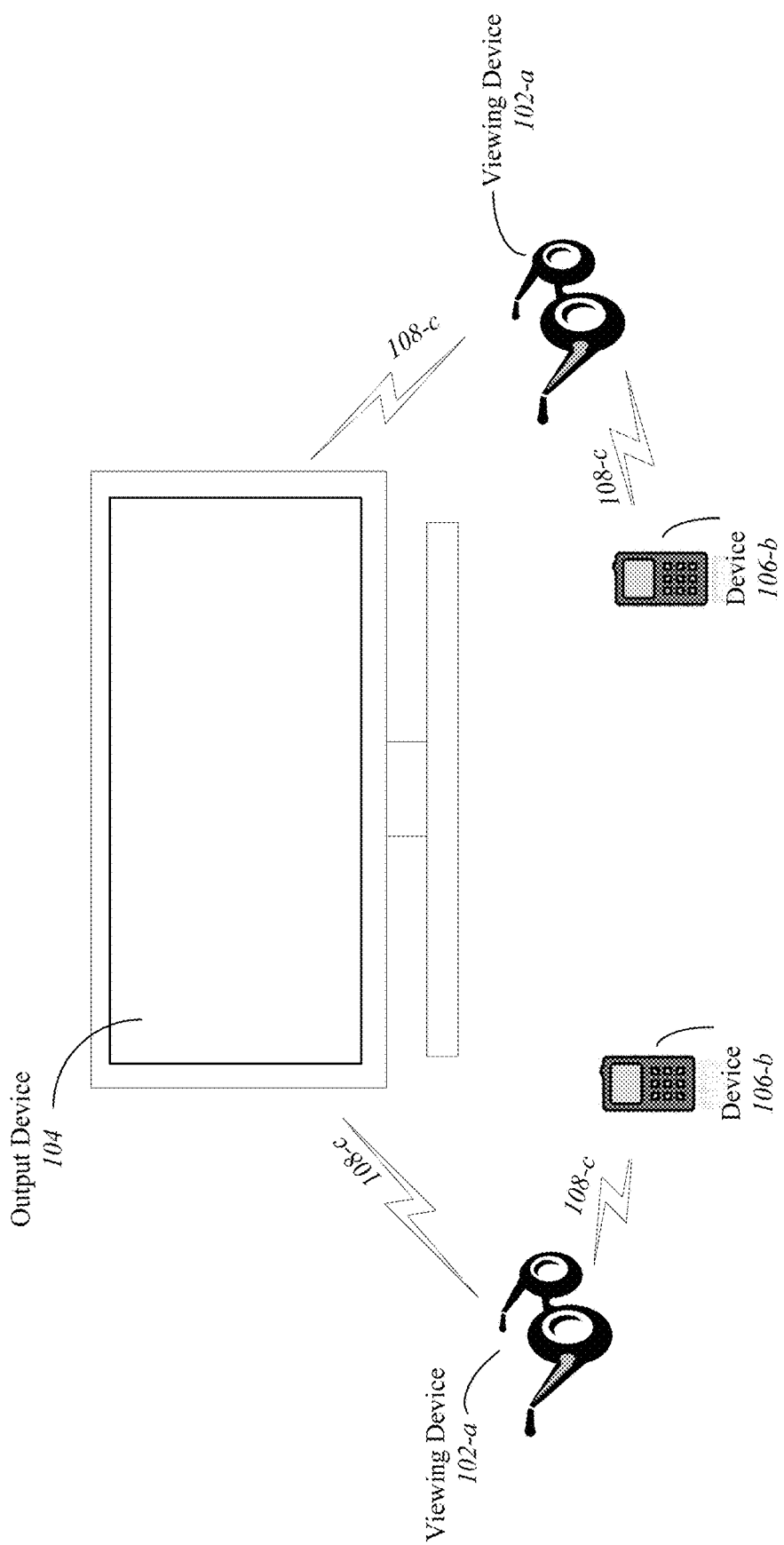
FIG. 1 illustrates an embodiment of a system.

Various embodiments are generally directed to techniques for automatically customizing a viewing device for a media system. A media system may present media information on a display, such as three dimensional content, for example. A viewing device, such as three-dimensional glasses, may be needed to clearly view the three-dimensional images. The embodiments allow the viewing device to be customized for one or more viewers. In this manner, a viewer may have a superior experience when watching three dimensional content.

Some embodiments are particularly directed to techniques for automatically customizing one or more settings for a viewing device to enhance a viewer experience. For example, a viewing device may receive a user profile having one or more parameters representing user desires for settings of the viewing device. The viewing device may also receive descriptive information about characteristics, properties or attributes of the media information to be viewed with the viewing device. Various settings of the viewing device may be modified based on the user profile and descriptive information of the media information. As a result, the viewing device may be customized for a specific viewer, thereby enhancing viewing experience of three dimensional content.

In one embodiment, for example, an apparatus may include a frame, two lenses, a processor circuit and a user settings component. The user settings component may be generally arranged to reconfigure the two lenses to filter media information to alter a user's perception of a three dimensional image. The user setting component may also be generally arranged to receive a user profile and descriptive information. The user profile may indicate user viewing information. The viewing information may include the viewing desires of a user. The viewing information may include the user's desired settings for one or more characteristics shown on an output device. The descriptive information may be characteristics, attributes and/or properties about the media information. The user settings component may adjust one or more settings in the apparatus based on the user profile and the descriptive information.

The embodiments provide several advantages over conventional techniques used to provide users with a three dimensional experience. For instance, the viewing apparatus allows a user to have a customized view of a display. By allowing a user to customize their view, the user may have a more enjoyable viewing experience. As the viewing apparatus, rather than the display, is individually customized, multiple users viewing the display may each have an optimized viewing experience based on their individual desires. Additionally, the user profile of the viewing apparatus may compensate for any sight-related problems of the user. For example, the viewing apparatus may be adjusted for a user who needs corrective lenses to allow the user to wear only the viewing device instead of a pair of three dimensional glasses in front of his/her regular prescription glasses. Also, for a color blind user, the settings on the viewing device may be adjusted to allow the user to best differentiate among colors. Other advantages include that the viewing apparatus can be worn whenever a user views a screen as the glasses will adjust the settings based on the user profile, descriptive information of the media information and the environment. For example, by adjusting the settings on the viewing apparatus for different displays, a user wearing the viewing apparatus may have optimal settings both in front of his computer playing a video game and in front of his television watching a three dimensional movie.

By determining the settings of the viewing device based on the descriptive information and the user's desires given in the user profile, the user's experience may be enhanced. For example, a first user who is particularly sensitive to the depth cue characteristic of three dimensional images may have their particular viewing device adjusted so the setting on his/her viewing device minimizes the depth cue characteristic. However, a second user watching the same output device and wearing a customized viewing device may view the three dimensional images with high depth cues as the high depth cues may provide the second user with a pleasurable viewing experience. By adjusting the settings on the viewing device instead of the output device, each user's experience will be individualized based on a user profile. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates an embodiment of a system of user profiles for viewing devices. The system 100 is generally directed to manipulating settings on a user's viewing device in accordance with the descriptive information and the user profile. As a result, the user may view images through the viewing device that are on the output device and based on the settings in the user's viewing device. The settings of the characteristics, such as, but not limited to, depth cues, resolution, smoothness, contrast and/or brightness, of the images will correspond to the settings in the user profile.

The system 100 may be suitable for any use involving presentation and display of images, such as, but not limited to, a home setting, a movie theater setting, and an office setting. Although the system 100 shown in FIG. 1 has a limited number of elements in a certain topology, it may be appreciated that the system 100 may include more or less elements in alternate topologies as desired for a given implementation. The embodiments are not limited in this context.

In various embodiments, various elements of the system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the system 100 may be arranged to communicate, manage or process different types of information, such as media information and control information. Examples of media information may generally include any data or signals representing images or multimedia content meant for a user, such as media content, voice information, video information, audio information, image information, textual information, content information, environmental information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, the system 100 may be implemented as a wired communication system, a wireless communication system, or a combination of both. Although the system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the system 100 may include one or more wireless elements arranged to communicate information over one or more types of wireless communication media. An example of wireless communication media may include portions of a wireless spectrum, such as the radio frequency (RF) spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context. The wireless communication media may be transmitted using Bluetooth and/or infrared signals.

In the illustrated embodiment shown in FIG. 1, the system 100 may comprise an output device 104 and one or more viewing devices 102-a. The output device 104 and the viewing devices 102-a may be communicatively coupled via respective wireless or wired communications connections 108-c. The devices 106-b and the viewing devices 102-a may be communicatively coupled via respective wireless or wired communications connections 108-c.

It is worthy to note that "a" and "b" and similar designators as used herein are intended to be variables representing any positive integer. Thus, for example, if an implementation sets a value for a=5, then a complete set of viewing devices 102-a may include viewing devices 102-1, 102-2, 102-3, 102-4 and 102-5. The embodiments are not limited in this context.

While various embodiments refer to the one or more viewing devices 102-a providing information to the one or more devices 106-b and the one or more devices 106-b receiving information from the one or more viewing devices 102-a, it should be understood that there may be a bi-directional exchange between the one or more viewing devices 102-a and the one or more devices 106-b. For example, one or more devices 106-b may be operative to provide information to the one or more of one or more viewing devices 102-a.

The system 100 may include one or more devices 106-b. In general, a device 106-b may comprise any component or device capable of providing information to and receiving information from the one or more viewing devices 102-a. Examples of devices 106-b may include, without limitation, set-top boxes, remote controls, pointing devices, keyboards, keypads, trackballs, trackpads, touchscreens, joysticks, game controllers, sensors, personal computing devices, mobile computing devices, laptop computers, desktop computers, handheld computing devices, tablet computing devices, netbook computing devices, smart phones, cellular telephones, wearable computers, and so forth. The embodiments are not limited in this context.

The system 100 may include an output device 104. An output device 104 may comprise any electronic device capable of reproducing, rendering or presenting images, such as media content, for consumption by a human being or user. Examples of output devices 104 may include without limitation a display, an analog display, a digital display, a television display, a mobile computing display, a laptop computer display, a desktop computer monitor, a handheld computing display, a tablet display, a computing device monitor, a netbook computing display and so forth. The embodiments are not limited in this context.

The output device 104 may present images, such as, but not limited to, three dimensional images. The output device 104 may be viewed by a user wearing a viewing device 102-a. The output device 104 may comprise any analog or digital display capable of presenting media information. The output device 104 may display the media information at a defined format resolution. For example, the incoming video signals received from media sources may have a native format, sometimes referred to as a visual resolution format. Examples of a visual resolution format include a digital television (DTV) format, high definition television (HDTV), progressive format, computer display formats, and so forth. The display on the output device may present two and/or three dimensional images.

The system 100 may include one or more viewing devices 102-a. The viewing device 102-a may include glasses, such as, but not limited to, three dimensional glasses and/or liquid crystal shutter glasses. The viewing device 102-a may be a pair of glasses with a frame and two lenses. The frame may include two arms and a nose bridge. For example, the viewing device 102-a may include a frame, a left lens and a right lens. In an example, a lens may include, but is not limited to, a filter lens. In another example, one or more filters may be part of and/or separate from a lens. Filters may include, but are not limited to, analog filters and digital filters. A user may view one or more images presented by the output device 104 through a viewing device 102-a. For example, a user may use the viewing device 102-a to view media information, such as, but not limited to, three dimensional images presented by output device 104.

A viewing device 102-a may adjust its settings based on one or more signals 108-c from the output device 104. The signals 108-c may include, but are not limited to, communication signals, such as, Wireless Fidelity (WiFi), Bluetooth or infrared signals.

A user viewing the display of the output device 104 may wear a viewing device 102-a. The viewing device 102-a may customize the way an image appears to a user wearing the viewing device 102-a by adjusting one or more settings. The viewing device 102-a may adjust the settings by reconfiguring one or more lenses and/or filters to alter the way an image appears to a user. For example, the settings may reconfigure two lenses in a frame to filter media information to alter a user's perception of a three dimensional image.

The viewing device 102-a may be customized for the individual user. For example, two users may be viewing the same output device 104. Each user may wear a customized viewing device 102-a and based on the settings in the individual's viewing device 102-a, each user may view two different images or representations of the three dimensional content. A first user may have different settings than a second user for the same characteristics, such as, but not limited to coloring and depth cue. For example, a first user may view the images as having a red tint based on a first user profile while a second user may view the images as having a low depth cue based on a second user profile.

The viewing device 102-a may be used with any output device 104. For example, a user may be wearing the viewing device 102-a and may first view a television screen and then continue to wear the viewing device 102-a while viewing a computer screen. As the viewing device 102-a will receive the descriptive information about characteristics, attributes and properties of the media information from both the television and the computer screen, the viewing device 102-a may automatically adjust the settings based on the descriptive information at each output device.

Figure 2:
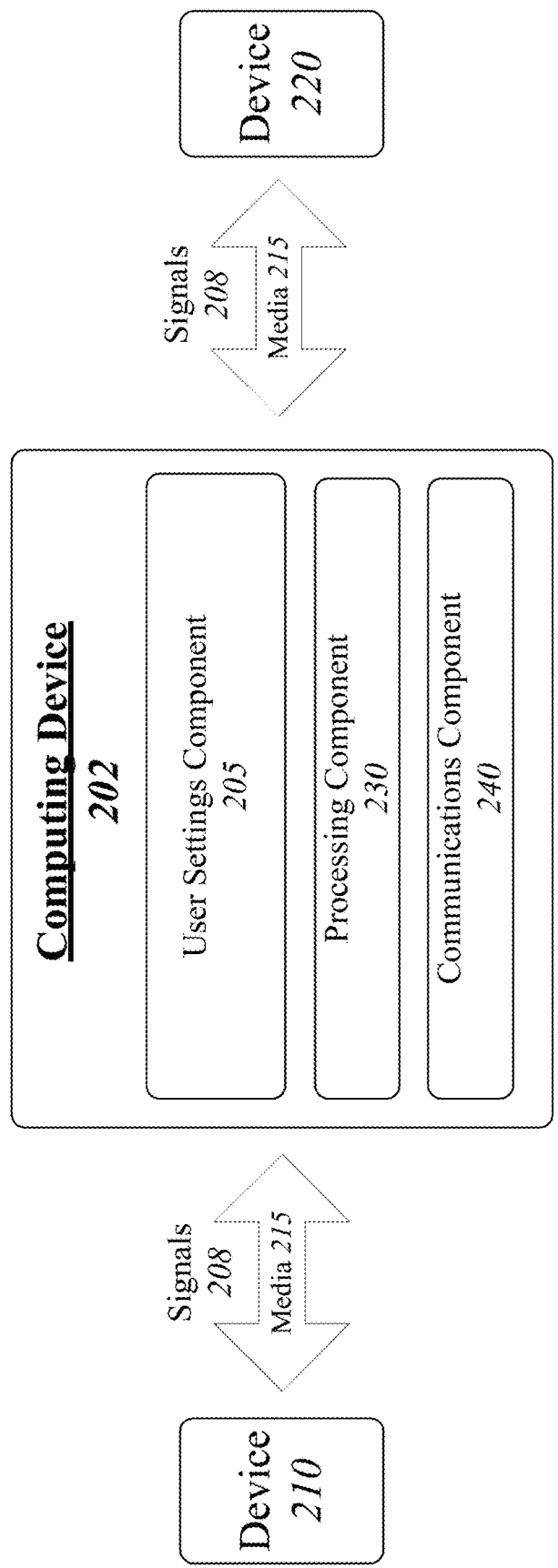
FIG. 2 illustrates an embodiment of a centralized system.

FIG. 2 illustrates an embodiment of a centralized system for viewing devices. In one embodiment, the viewing device system 200 may comprise a computer-implemented system 200 having one or more software applications and/or components. Although the system 200 shown in FIG. 2 has a limited number of elements in a certain topology, it may be appreciated that the system 200 may include more or less elements in alternate topologies as desired for a given implementation.

A viewing device 102-a may include a computing device 202. A computing device 202 may be implemented in any number of form factors including without limitation a pair of glasses, a pair of three dimensional glasses, a computer, a workstation, a desktop computer, a laptop computer, a tablet, a mobile device, a notebook computer, a handheld computer, a telephone, a cellular telephone, a personal digital assistant (PDA), a combination cellular telephone and PDA, and so forth.

The computing device 202 may include a user settings component 205. The user settings component 205 may be generally arranged to adjust settings on a viewing device 102-a so as to customize the settings of the viewing device 102-a based on a user profile. The user settings component 205 may adjust the settings based on received information in order to provide an enjoyable viewing experience for a user of the viewing device 102-a. The user settings component 205 may receive descriptive information about the media information, such as three dimensional videos, environmental factors and a user profile.

The user settings component 205 may receive a user profile. A user profile may be the desires determined and/or selected by a user. The user profile may be used by the user settings component 205 to determine how to adjust the settings. By adjusting the settings based on user desires, a user may have an enjoyable three dimensional viewing experience. Additionally, the user setting component 205 may receive descriptive information about the media information displayed on the output device and environmental factors which may affect the display of the images on the output device. Based on the user profile, the descriptive information and/or the environmental factors, the user setting components may adjust the settings of the viewing device.

The computing device 202 may include a processing component 230. The processing component 230 may comprise various hardware elements, software elements, or a combination of both. Examples of hardware elements may include devices, components, analog filters, digital filters, lenses, filter lenses, mirrors, processors, processor circuits, processing units, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The processing component 230 may execute communications operations or logic for the viewing device 202 using the communications component 240. The communications component 240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 240 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 215 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 215.

The computing device 202 may communicate with other devices 210, 220 over a communications media 218 using communications signals 208 via the communications component 240. The communication signals 208 may include Bluetooth, WiFi and infrared signals. The devices 210, 220 may include, but are not limited to, an output device 104, a device 106-b and/or a server.

Figure 3:
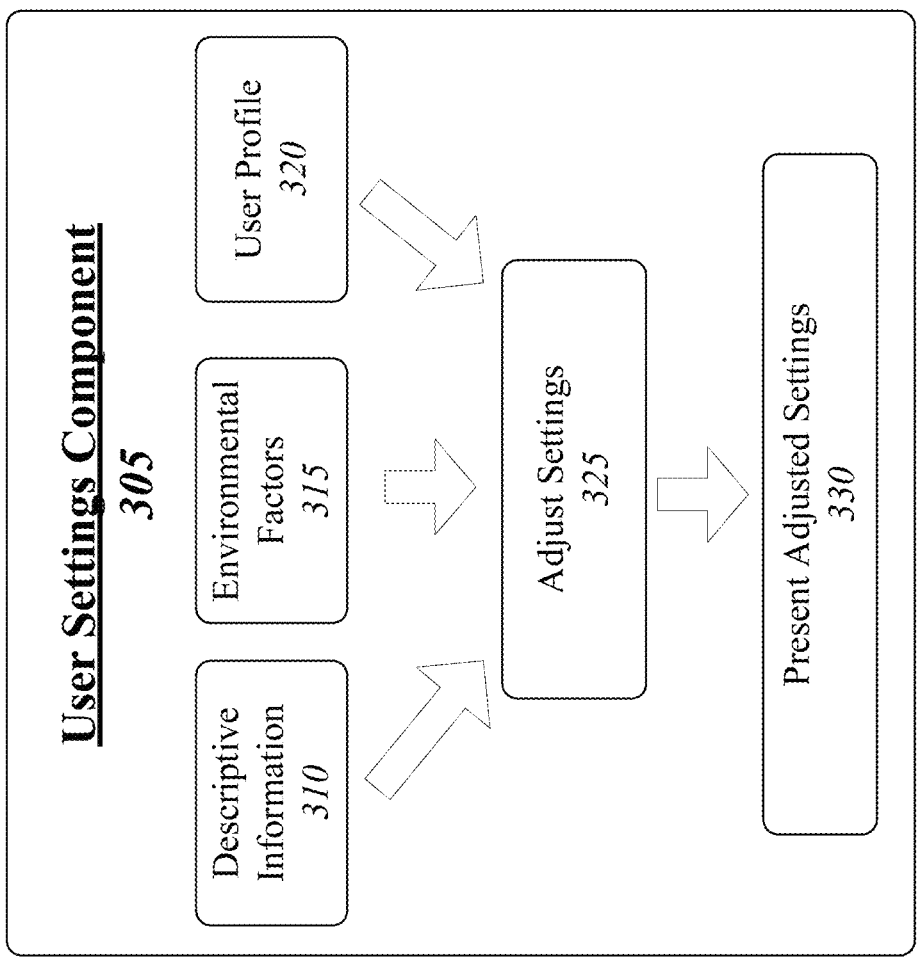
FIG. 3 illustrates an embodiment of an exemplary user settings component.

FIG. 3 illustrates an embodiment of an exemplary user settings component 305. The user setting component 305 may be generally arranged to adjust settings on a viewing device 102-a so as to customize the settings of the viewing device 102-a. The user setting component 305 may reconfigure lenses in a viewing device 102-a to filter media information to alter a user's perception of a three dimensional image. The user setting component 305 may use various types of information to adjust the settings 325, such as descriptive information 310 about the media information, environmental factors 315, a user profile 320, and other types of information relevant to a setting of the viewing device 102-a.

Referring to the illustrated embodiment shown in FIG. 3, the user settings component 305 may be generally arranged to receive descriptive information 310 about the media information. The descriptive information 310 may include characteristics, properties and/or attributes of the media information to be viewed with the viewing device. The media information may include current images presented on a display of the output device. For example, television shows and/or movies may be broadcast in three dimensions. The settings of the three dimensional images displayed may vary based on the television show and/or the movie. For example, a movie may have large depth cues and a high resolution while a first television show projected from the same display may have medium depth cues and low resolution and a second television show may have small depth cues and high resolution. Therefore, descriptive information 310 about characteristics, attributes and/or properties of the media information may be provided to the user settings component 305 in order for the viewing device to adjust its settings.

The user setting component 305 of the viewing device may receive descriptive information 310 about the media information. The media information may generally include content presented on a display of the output device. The media information may include, but is not limited to, three dimensional videos, movies, shows and games, other three dimensional images, two dimensional videos, movies and games, as well as other two dimensional images. The descriptive information 310 may generally include characteristics, attributes and/or properties of the various settings of the media information. For example, the descriptive information 310 from the media information may include an indication that there is a red tint in the media information and/or an indication that there is a high depth cue in the media information.

Based on the descriptive information 310 about the media information, the settings may be adjusted 325 on the user's viewing device 102-a. The adjustments may allow a user to view images according to the desires expressed in the user profile 320. By automatically adjusting the settings 325 of the viewing device 102-a based on the descriptive information 310 about the media information, the user may enjoyably view the output device 104. As the media information changes, the descriptive information 310 sent to the user settings component 305 changes and the setting of the viewing device 102-a may be automatically adjusted.

In addition to the descriptive information 310, environmental factors 315 may affect a user viewing the output device 104. The user settings component may adjust 325 the settings of the user's viewing device 102-a based on the environmental factors 315. Environmental factors 315 may include characteristics, attributes and/or properties concerning the area surrounding an output device 104. Environmental factors 315 may include the amount of light surrounding a user wearing the viewing device 102-a and watching a display on the output device 104. The light may include direct light sources, such as, but not limited to the sun, indirect light sources and ambient light. Other environmental factors 315 may include the pressure, elevation and/or temperature in the location of the output device 104. Still other environmental factors 315 may include the distance from the viewing device 102-a to the output device 104-a and/or the user's head position with the viewing device 102-a in viewing the output device 104. The embodiments are not limited to these examples. The user settings component 305 may obtain environmental factors 315 in order to adjust the settings of the viewing device 102-a.

The user settings component 305 within the viewing device 102-a may receive the settings of one or more characteristics of the user profile 320. The user profile 320 may generally include the desires of an individual user. For example, a user may become nauseated when the depth cue characteristic is high. As a result, the user profile 320 for that user may have a depth cue characteristic set at a low level indicating the user's desire for more shallow three dimensional images. In another example, a user may desire a smooth presentation of the three dimensional images over the sharpness of each image being shown. As a result, the user profile 320 for the user may have a smoothness characteristic set at the highest level indicating the user's desire for a smooth presentation while the user profile 320 may have the sharpness characteristic set at a normal or lower level.

Figure 4:
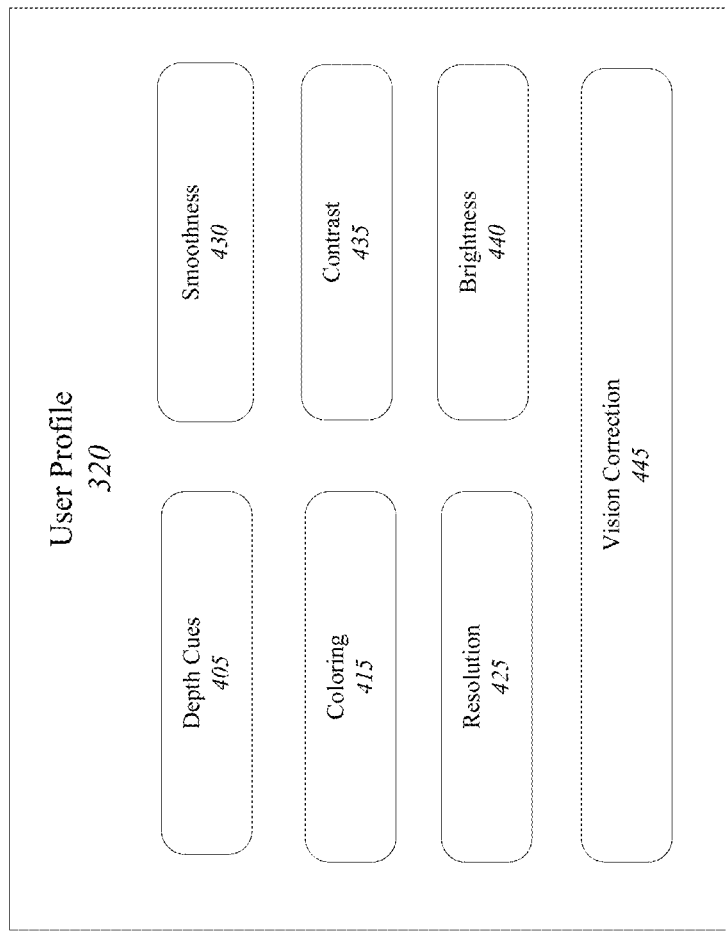
FIG. 4 illustrates an embodiment of a user profile.

FIG. 4 illustrates an embodiment of a user profile 320. Characteristics of the user profile 320 may generally provide individual elements of how users perceive an image. Characteristics of the user profile 320 may include, but are not limited to, depth cues 405, coloring 415, resolution 425, smoothness 430, contrast 435, brightness 440 and vision correction 445. The embodiment is not limited to the characteristics listed.

The user profile 320 may save and store the settings for each characteristic. For example, the depth cues characteristic 405 may include information or any other indication that the user desires an image to look shallow or deep.

The coloring 415 characteristic may include information or any other indication that the user desires the images to have a red or blue tint on the color spectrum. For example, a user may desire a red tint on images. The coloring 415 characteristic may be set so that user profile 320 indicates the user desires a red tint.

The resolution 425 characteristic may include the detail of an image. The resolution 425 may refer to how closely two lines may be to one another and still be differentiated. The settings for a resolution 425 characteristic may be determined and stored in the user profile 320.

The smoothness 430 characteristic may refer to the lines between multiple items in an image. The smoothness 430 characteristic may be adjusted by changing the shutter speed between the left and the right eye. An algorithm for the setting for the smoothness 430 characteristic may be determined and stored in the user profile 320. For example, a first algorithm may set the smoothness 430 characteristic and a second algorithm may set the brightness 440 characteristic.

The contrast 435 characteristic may include the differences in color and light between parts of an image. The contrast 435 characteristic may be used by a user to differentiate between various objects within an image. A first user may be more sensitive to color and/or light than a second user. Accordingly, the user profile 320 for the first user may have a low contrast 435 characteristic value while the user profile 320 for the second user may have a high contrast 435 characteristic value.

The brightness characteristic 440 may include information or any other indication that the images appear in bright tones or muted tones. For example, one user may find that bright colors give them a headache. That user may indicate in the user profile 320 that he/she wants the colors of the images to be muted. As a result, the user settings component 305 may adjust the images so that a user will only view muted colors. The display on the output device 104 may present bright and vibrant colors, but the user wearing the viewing device 102-a may only view muted colors. The user may view muted colors as the user settings component 305 of the viewing device 102-a may reconfigure the lenses to filter the media information to alter the user's perception of the image. By wearing the viewing device 102-a while viewing the output device 104, the user may view the images without fear of developing a headache from bright colors.

The user profile 320 may compensate for any sight-related problems of the user. For example, the user profile 320 may include information on whether a user is color blind or needs corrective lenses 445. For example, one user may be color blind. The settings for the user's viewing device 102-a may be adjusted based on the user profile 320 in order to compensate for the user being color blind. The settings on the user's viewing device 102-a may be adjusted to allow the user to best differentiate among colors.

A user may need a vision correction 445 as the user typically wears glasses. The user profile 320 may indicate the user's corrective prescription 445. The user profile 320 may be used to adjust the settings on the viewing device worn by the user so that the user may clearly see the images from the display without the need for their normal glasses. In other words, the viewing device 102-a may replace the use of the regular prescription glasses.

Figure 5:
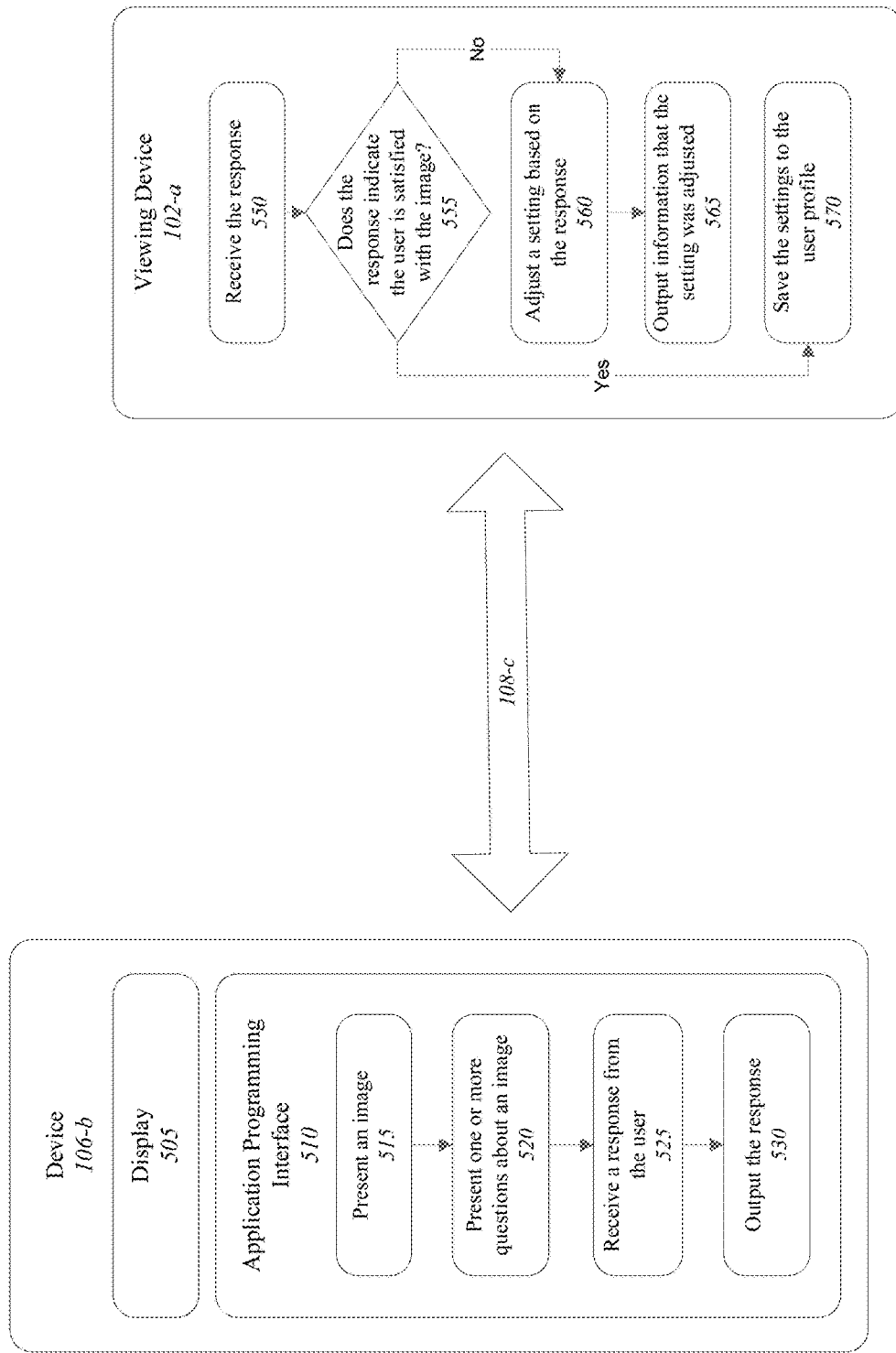
FIG. 5 illustrates an embodiment of determining the settings for the user profile characteristics.

FIG. 5 illustrates an embodiment of determining the settings for characteristics of the user profile 320. A characteristic of the user profile 320 may be set to a value. The characteristics in the user profile 320 may be set to a default value. The default value may be the most common value for each characteristic. For example, the contrast characteristic 435 may be set to a high value as the default value as most viewers may enjoy a sharp image. A user may wear and use the viewing device 102-a with the user profile 320 being set to the default values.

The settings of the user profile 320 may be determined by testing a user's desires. A device 106-b may be placed in a testing mode in order to test desires for a user. The testing mode is different from a viewing mode, where a user is actually viewing media information in real-time, such as when watching a movie or television program. In a testing mode, an application programming interface 510 may be generally arranged to determine the settings for the characteristics in the user profile 320. The application programming interface 510 may send information to the viewing device 102-a. The application programming interface 510 may be software and/or hardware within a device 106-b, such as any of the devices 106-b described in FIG. 1. For example, the device 106-b may include, but is not limited to, a set top box, a mobile device and/or desktop computing device.

The application programming interface 510 may present an image 515 on a display 505 of the device 106-b. The application programming interface 510 may determine what image may be presented on the display 505 of the device 106-b. For example, if the device 106-b is a desktop computing device, the display 505 may the monitor of the device 106-b. The image presented may be used to determine a user's desire for a particular characteristic of an image.

The application programming interface 510 may present 525 one or more questions about the image to the user. The questions may appear on the display 505 of the device 106-b.

A user may view an image from the display 505 of the device 106-b through a viewing device 102-a. The user may respond to the questions via the device 106-b. The application programming interface 510 may receive 525 control directives indicating a response from the user via the device 106-b.

After receiving the response, the application programming interface 510 on the device 106-b may output 530 the response. The application programming interface 510 may communicate the user's desires to the viewing device 102-a. The application programming interface 510 may send the response to the viewing device 102-a via one or more signals 108-c.

The viewing device 102-a may receive 550 control directives indicating the user's response from the application programming interface 510. The viewing device 102-a may receive the control directives indicating the response from the application programming interface 510 via one or more signals 108-c. The signals 108-c may include, but are not limited to the signals discussed in FIG. 1. For example, the signals 108-c may include infrared, Bluetooth and WiFi signals.

The viewing device 102-a may determine 555 whether the response indicates that the user is satisfied with the image. Based on the user's response, the viewing device 102-a may determine that the user is not satisfied with the image.

The viewing device may adjust 560 the setting of the characteristics of the user profile 320 affected by the user's response. A response may correspond to a setting of a single characteristic or to settings of multiples characteristics in the user profile 320. The settings may be adjusted based on one or more control directives received from the device 106-b.

After the viewing device 102-a adjusts the settings of the one or more characteristics of the user profile 320, the viewing device 102-a may output 565 information to the application programming interface 510 indicating that the setting was adjusted. The viewing device 102-a may send one or more signals 108-c to the application programming interface 510 to present one or more questions to the user about the image on the display 505. The application programming interface 510 may again present 520 the questions about the image on the display 505. The application programming interface 510 may receive 525 a response and then output 530 the response. The response may again be received 550 by the viewing device 102-a. The viewing device 102-a may determine 555 whether the response indicates that the user is satisfied with the image on the display 505.

When the response indicates that the user is satisfied with the image of the display 505, the viewing device 102-a may save the settings 570 to the user profile 320. This process may occur with one or more of the characteristics of the user profile 320.

For example, a user may view an image presented on a display 505 using a viewing device 102-a, such as, but not limited to, three dimensional glasses. The user may be asked whether the color is accurate based on his/her vision. The user may enter a response into the device 106-b. The user may have a choice of responses such as "yes", "no, the people in the image look like they are tinted blue" or "no, the people in the image look like they are tinted red". Based the user's response, the settings for the color characteristic in the user profile 320 may be determined.

For example, the user may indicate, using the device 106-b, that the images have a blue tint. Based on the user's input into the device 106-b, one or more signals 108-c may be sent from the device 106-b to the viewing device 102-a to indicate that the characteristics in the user profile 320 should have the color characteristic indicate a desire for a red tint as a red tint would offset the blue tint seen by the user. The user settings component 305 in the viewing device 102-a may adjust the settings of the viewing device 102-a. The viewing device 102-a may send a signal 108-c to the device 106-b to again ask the user about the image. If the user now finds the image to be accurate, the application programming interface 510 may output the response from the user and the viewing device 102-a may save the settings for the color characteristic in the user profile 320.

For example, a bright image may be presented on the display 505 of the device 106-b. The user may be asked whether the image is too bright. If the user answers yes, the image may be darkened via the settings on the viewing device 102-a and the user may once again be asked whether the image is too bright. As a result of the testing, a user profile 320 may be generated and/or updated. The user profile 320 allows the settings of the viewing device 102-a to be individualized for the particular user.

The user profile 320 may be updated. The viewing device 102-a may update the user profile 320 when a user changes from one output device 104 to a second output device 104. For example, the user may have one user profile 320 for viewing a television display and another user profile 320 for a computer monitor display.

The user profile 320 may also be updated based on feedback from the user. For example, the user may provide feedback about his/her experience with the viewing device 102-a via a device 106-b. Alternatively or in addition, he user may periodically provide feedback via the device 106-b. In order to provide feedback, the user may go through a test mode as described in FIG. 5 with the application programming interface 510. The user may periodically provide feedback due to shifting expectations and/or environmental factors 315. Alternatively or in addition, a user may provide feedback based on his/her experience at any time. For example, if the user feels the depth cues are not deep enough, the user may provide feedback. The user may use the application programming interface 510 on the device 106-b to increase the depth cue characteristic in his/her user profile 320. The application programming interface 510 may output 530 the information to the viewing device 102-a and the viewing device 102-a may adjust 560 a setting of a characteristic based on the user feedback.

Referring back to FIG. 3, the user setting component 305 in the viewing device 102-a may receive the user profile 320. The user profile 320 may be stored in the viewing devices 102-a. A single user profile 320 may be stored on the viewing device 102-a. In a first example, a user may buy a viewing device 102-a. In a second example, the viewing device 102-a may come with default settings. The user may use the application programming interface 510 to adjust the settings of each characteristic of the viewing device 102-a to allow a user to best view three dimensional images on an output device 104. The settings may be stored and each time the user wears the viewing device 102-a, the stored settings may be provided to the user.

Multiple user profiles 320 may be stored within the viewing device 102-a. The multiple user profiles 320 may be stored in a chart, table and/or database in a computer-readable storage medium. The computer-readable storage medium may include any tangible non-transitory media capable of storing electronic data, including, but not limited to, volatile memory or non-volatile memory, removable or non-removable memory, erasable or non-erasable memory and/or writeable or re-writeable memory.

The viewing device 102-a may receive the user profile 320 from a remote source, such as but not limited to, a remote server (e.g., one of the devices 210, 220). The viewing device 102-a may communicate with the server to obtain a user profile 320. The viewing device 102-a may use the user profile 320 to adjust the settings in the viewing device 102-a. If the user profile 320 is stored in a remote source, the viewing device 102-a may not be associated with any particular user prior to the viewing device 102-a receiving a user profile 320.

When a viewing device 102-a may receive multiple user profiles 320, the viewing device 102-a may be able to determine which user profile 320 to receive based on the user. The user may provide information such as security credentials. Security credentials may include, but not limited to, a log-in and/or password to the device 106-b. Based on the log-in and/or password, the device 106-b may determine the user profile 320 associated with the user. The device 106-b may communicate with the viewing device 102-a so that the viewing device 102-a receives the user profile 320. The embodiments are not limited in this context.

Once the user profile 320 is received, the user settings component 305 may use the user profile 320, descriptive information 310 from the media information and environmental factors 315 to adjust 325 the settings of the viewing device 102-a. By adjusting the settings in the viewing device 102-a, the viewer may have his/her desired viewing experience.

Once the settings in the viewing device 102-a are adjusted 325, the user settings component 300 may present 330 the adjusted settings to the viewer. By presenting the adjusted settings, a viewer may receive an individualized viewing experience.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
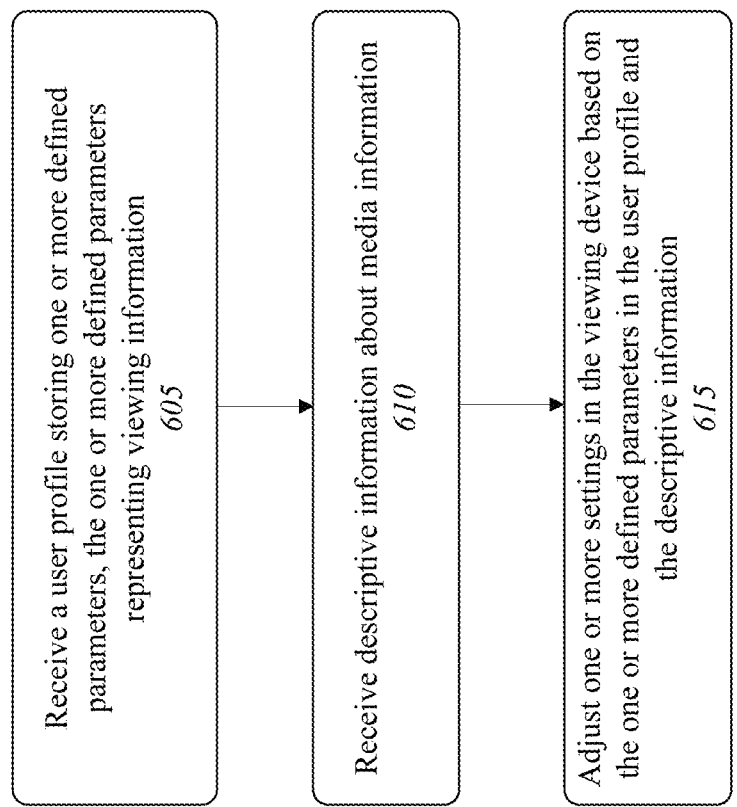
FIG. 6 illustrates an embodiment of a logic flow.

FIG. 6 illustrates an embodiment of a logic flow 600. The logic flow 600 may be representative of some or all of the operations executed by one or more embodiments described herein.

In the illustrated embodiment shown in FIG. 6, the logic flow 600 receives a user profile 320 storing one or more defined parameters at block 605. The one or more defined parameters may represent viewing information. The user profile 320 may be received by a processor circuit in the viewing device 102-a. The viewing device 102-a may include, but is not limited to, three dimensional glasses worn by the user.

The viewing device 102—may receive a user profile 320. The user profile 320 may be stored in the viewing device 102-a or the user profile 320 may be stored in an external location such as, but not limited to, on an external database or server. The user profile 320 may include viewing information. The viewing information may include the viewing desires of a user. The viewing information may include the user's desired settings for one or more characteristics. Characteristics of the user profile 320 may generally provide individual elements of how users perceive an image. Characteristics of the user profile 320 may include, but are not limited to, depth cues 405, coloring 415, resolution 425, smoothness 430, contrast 435, brightness 440 and vision correction 445. The user may determine his/her desired settings and save the settings in the user profile 320.

The logic flow 600 receives descriptive information 310 about media information at block 610. The viewing device 102-a may receive descriptive information 310. Descriptive information 310 may include information about the settings of the images on an output device 104. A user wearing the viewing device 102-a may view the output device 104 through the viewing device 102-a. The viewing device 102-a may receive descriptive information 310 about the media information from the output device 104. The output device 104 may communicate with the viewing device 102-a via signals 108-c, such as, but not limited to, Bluetooth, infrared, and WiFi. The signals 108-c may provide the viewing device 102-a with descriptive information 310 about the media information from the output device 104. For example, the descriptive information 310 may state that the media information displayed on the output device 104 may have a high resolution.

The logic flow 600 adjusts one or more settings in the viewing device 102-a based on the one or more defined parameters in the user profile 320 and the descriptive information 310 at block 615. The viewing device 102-a may adjust one or more settings so that the user may view the media information, via the viewing device 102-a, based on the defined parameters in the user profile 320. The user profile 320 may provide the viewing device 102-a with information regarding the user's desired view. The descriptive information 310 may provide the viewing device 102-a with information about the actual settings of the media information being displayed on the output device 104. The viewing device 102-a may take the settings that the user wants from the user profile 320 and the descriptive information 320 from the media information from the output device 104, and adjust the settings on the viewing device 102-a so that the user is able to view the media information according to the settings in the user profile 320.

For example, an image from the media information may appear to have bright colors, but the user may desire muted colors. The viewing device 102-a may adjust the settings so that the user viewing the images through the viewing device 102-a may view muted colors.

Figure 7:
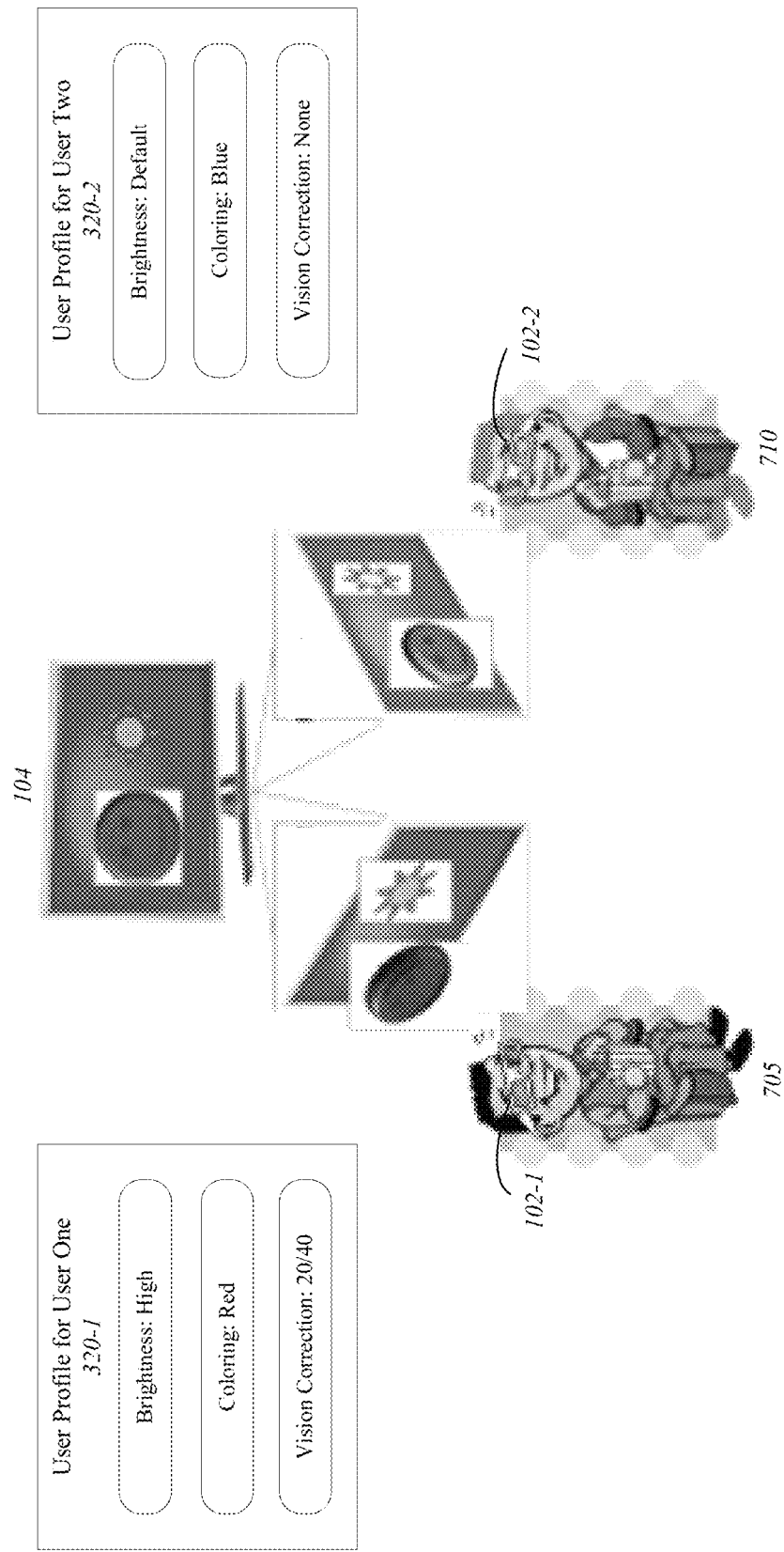
FIG. 7 illustrates an embodiment with two users and their profiles.

FIG. 7 illustrates an embodiment with two users and their profiles. The system 700 depicts a first user 705 and a second user 710. The first user 705 is wearing his viewing device 102-1 which has settings which were adjusted based on his user profile 320-1. The second user is wearing his viewing device 102-2 which has settings which were adjusted based on his user profile 320-2. The two users 705, 710 are both viewing the same display 104. However, based on their user profiles 320-1, 320-2, the two users are seeing different renderings of the same media information. For example, the brightness characteristic in the first user profile 320-1 may be set to a high value, while the brightness characteristic in the second user profile 320-2 may be set to the default value of medium. The coloring characteristic for the first user profile 320-1 may be set to red while the coloring characteristic in the second user profile 320-2 may be set to blue. Also, the first user may need glasses, so the first user profile 320-1 may include a vision correction setting. Based on their respective user profiles 320-1, 320-2, the two users 705, 710 viewing the same display 104, may view two different images or representations of the three dimensional content the media information through the adjusted settings in the viewing glasses 102-1, 102-2.

Figure 8:
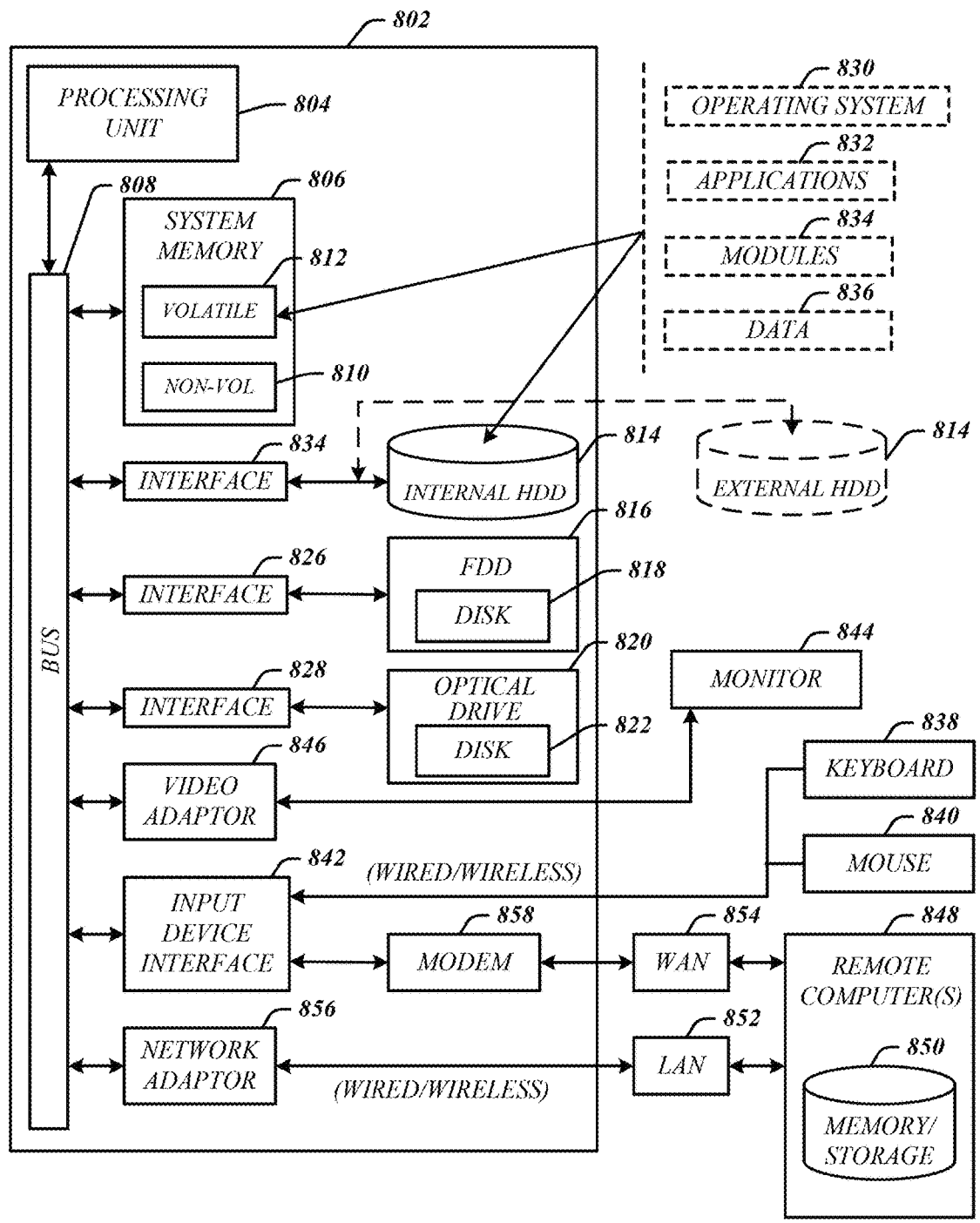
FIG. 8 illustrates an embodiment of a computing architecture.

FIG. 8 illustrates an embodiment of an exemplary computing architecture 800 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a processor circuit, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 800 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 800 includes various common computing elements, such as one or more processors, processor circuits, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The computing architecture 800 may comprise or implement various articles of manufacture. An article of manufacture may comprise a computer-readable storage medium to store logic. Embodiments may also be at least partly implemented as instructions contained in or on a non-transitory computer-readable storage medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

The one or more application programs 832, other program modules 834, and program data 836 can include, for example, a user settings component 205.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, gesture, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3—related media and functions).

Figure 9:
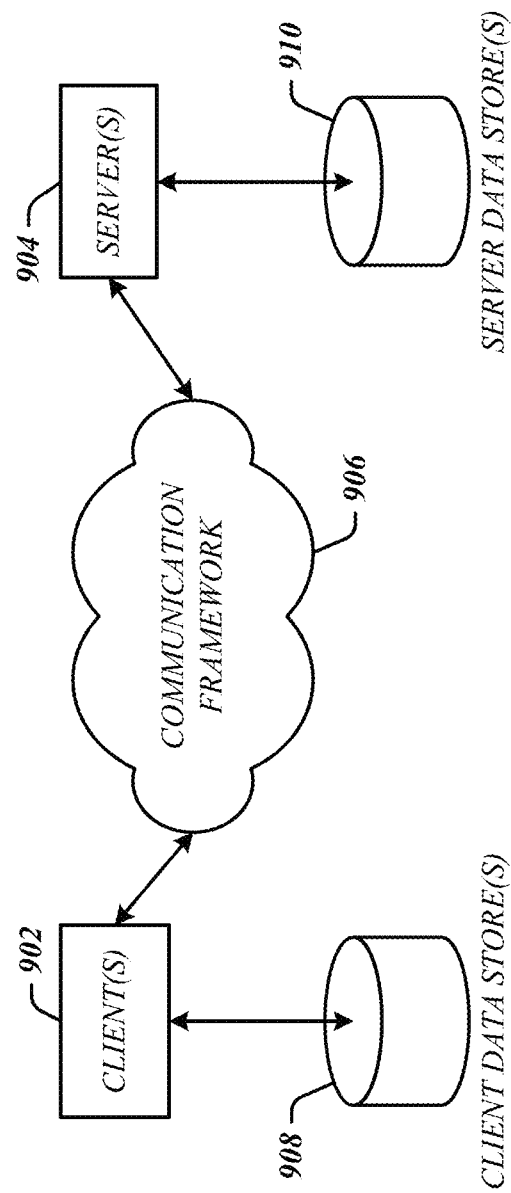
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols, such as those described with reference to systems 200 and 600. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

In an embodiment, a computer-implemented method may include receiving a user profile storing one or more defined parameters. The one or more defined parameters may represent viewing information. Descriptive information about the media information to be viewed on a viewing device may be received. One or more settings of the viewing device may be adjusted based on at least the user profile and the descriptive information. The computer-implemented method may automatically adjust the one or more settings based on one or more environmental factors. The computer-implemented method may receive attributes of one or more three dimensional images. Media information may include three dimensional images. The computer-implemented method may include receiving the user profile via an external source. The computer-implemented method may receive the user profile based on security credentials. The computer-implemented method may include adjusting the one or more settings of the viewing device based on control directives received from a device. The computer-implemented method may include adjusting the settings of one or more of a depth cue, coloring, resolution, smoothness, vision correction, contrast and brightness in the user profile. The computer-implemented method may include updating the user profile based on control directives received from a device.

In an embodiment, an apparatus may include a processor circuit and a user settings component. The user settings component may be operatively coupled to the processor circuit. The apparatus may include a frame, two lenses, a processor circuit, and a user settings component operatively coupled to the processor circuit. The user settings component may be operative to reconfigure the two lenses to filter media information to alter a user's perception of a three dimensional image. The user settings component may receive a user profile storing one or more defined parameters. The one or more defined parameters may represent viewing information. Descriptive information about the media information to be viewed on the viewing device may be received. One or more settings of the apparatus may be adjusted based on at least the user profile and the descriptive information. The apparatus may include an infrared antenna coupled to the processor circuit. The user settings component may be operative to determine one or more current settings in the apparatus. One or more attributes about the media information may be received. The media information comprising three dimensional images. The user settings component may be operative to automatically adjust one or more settings based on one or more environmental factors. The user settings component may be operative to receive a user profile via an external source. The user settings component may be operative to adjust one or more settings of the apparatus based on control directives received from a device. The user settings component may be operative to adjust settings of one or more of a depth cue, coloring, resolution, smoothness, vision correction, contrast and brightness in the user profile. The user settings component may be operative to update a user profile based on control directives received from a device.

In an embodiment, an article of manufacture may include one or more storage mediums containing instructions that when executed cause a system to receive a user profile storing one or more defined parameters. The one or more defined parameters may represent viewing information. Descriptive information about the media information to be viewed on three dimensional glasses may be received. One or more settings of the three dimensional glasses may be adjusted based on at least the user profile and the descriptive information. The article of manufacture may include instructions that when executed cause the system to determine current settings in the three dimensional glasses. The article of manufacture may include instructions that when executed cause the system to automatically adjust the one or more settings based on one or more environmental factors. The article of manufacture may include instructions that when executed cause the system to receive the user profile via an external source. The article of manufacture may include instructions that when executed cause the system to receive the user profile based on security credentials. The article of manufacture may include instructions that when executed cause the system to adjust the one or more settings of the three dimensional glasses based on control directives received from a device. The article of manufacture may include instructions that when executed cause the system to adjust the settings of one or more of a depth cue, coloring, resolution, smoothness, vision correction, contrast and brightness in the user profile. The article of manufacture may include instructions that when executed cause the system to update the user profile based on control directives received from a device.

The invention claimed is:

1. An apparatus comprising:
 a frame;
 two lenses;
 a processor circuit; and
 memory coupled to the processor circuit, the memory comprising instructions that when executed by the processor circuit, cause the processor circuit to:
  receive, from a computing device, a user profile associated with a user, the user profile storing one or more defined parameters, the one or more defined parameters representing preferred viewing information of the user;
  receive, from the computing device, descriptive information about media information associated with a three dimensional image to be viewed on a display coupled to the computing device, wherein the descriptive information describes one or more of a characteristic, an attribute, or a property of the media information associated with the three dimensional image to be viewed;

store the user profile and the descriptive information to the memory;

reconfigure the two lenses to filter media information associated with a three dimensional image to alter a user's perception of the three dimensional image based on the one or more defined parameters in the user profile and the descriptive information; and adjust settings of one or more of a depth cue, coloring, resolution, smoothness, contrast and brightness in the user profile based on the one or more defined parameters in the user profile and the descriptive information.

2. The apparatus of claim 1, comprising:
an infrared antenna coupled to the processor circuit.

3. The apparatus of claim 1, the memory comprising instructions that when executed by the processor cause the processor to:
receive the user profile via an external source.

4. The apparatus of claim 1, the memory comprising instructions that when executed by the processor cause the processor to:
adjust one or more settings of the apparatus based on control directives received from a device.

5. The apparatus of claim 1, the memory comprising instructions that when executed by the processor cause the processor to:
adjust settings of a vision correction in the user profile.

6. The apparatus of claim 1, the memory comprising instructions that when executed by the processor cause the processor to:
update the user profile based on control directives received from a device.

7. A computer-implemented method, comprising:
receiving, at a viewing device from a computing device, a user profile associated with a user, the user profile storing one or more defined parameters, the one or more defined parameters representing preferred viewing information of the user;

receiving, at the viewing device from the computing device, descriptive information about media information associated with a three dimensional image to be viewed on a viewing device, wherein the descriptive information describes one or more of a characteristic, an attribute, or a property of the media information associated with the three dimensional image to be viewed;

storing the user profile and the descriptive information to a memory at the viewing device;

receiving environmental information to include an indication of one or more environmental factors;

adjusting one or more settings in the viewing device based on the one or more defined parameters in the user profile, the descriptive information, and the environmental information; and adjusting settings of one or more of a depth cue, coloring, resolution, smoothness, contrast and brightness in the user profile, based on the one or more defined parameters in the user profile, the descriptive information, and the environmental information.

8. The computer-implemented method of claim 7, comprising:
receiving attributes of one or more three dimensional images.

9. The computer-implemented method of claim 7, comprising:
receiving the user profile via an external source.

10. The computer-implemented method of claim 7, comprising:
receiving the user profile based on security credentials.

11. The computer-implemented method of claim 7, comprising:
adjusting the one or more settings of the viewing device based on control directives received from a device.

12. The computer-implemented method of claim 7, comprising:
adjusting the settings of a vision correction in the user profile.

13. The computer-implemented method of claim 7, comprising:
updating the user profile based on control directives received from a device.

14. An article of manufacture comprising one or more non-transitory computer readable storage mediums containing instructions that when executed by a processor of three-dimensional glasses cause the three-dimensional glasses to:
receive, from a computing device, a user profile associated with a user, the user profile storing one or more defined parameters, the one or more defined parameters representing preferred viewing information of the user;

receive, from the computing device, descriptive information about media information associated with a three dimensional image to be viewed on through the three dimensional glasses, wherein the descriptive information describes one or more of a characteristic, an attribute, or a property of the media information associated with the three dimensional image to be viewed;

storing the user profile and the descriptive information to a memory at the viewing device;

receiving environmental information to include an indication of one or more environmental factors;

adjust one or more settings in the three dimensional glasses based on the one or more defined parameters in the user profile, the descriptive information, and the environmental information; and adjust settings of one or more of a depth cue, coloring, resolution, smoothness, contrast and brightness in the user profile, based on the one or more defined parameters in the user profile, the descriptive information, and the environmental information.

15. The article of manufacture of claim 14, comprising instructions that when executed cause the viewing device to determine current settings in the three dimensional glasses.

16. The article of manufacture of claim 14, comprising instructions that when executed cause the viewing device to receive the user profile via an external source.

17. The article of manufacture of claim 14, comprising instructions that when executed cause the viewing device to receive the user profile based on security credentials.

18. The article of manufacture of claim 14, comprising instructions that when executed cause the viewing device to adjust the one or more settings of the three dimensional glasses based on control directives received from a device.

19. The article of manufacture of claim 14, comprising instructions that when executed cause the viewing device to adjust the settings of a vision correction in the user profile.

20. The article of manufacture of claim 14, comprising instructions that when executed cause the viewing device to update the user profile based on control directives received from a device.

21. The apparatus of claim 1, the descriptive information to include an indication of a resolution of the media information and a depth cue of the media information.

22. The apparatus of claim 1, the descriptive information to include an indication of a color tint to the media information.

* * * * *